Sept. 23, 1924.
J. BATH
1,509,578
ADJUSTABLE INTERNAL GAUGE
Filed Oct. 18, 1922
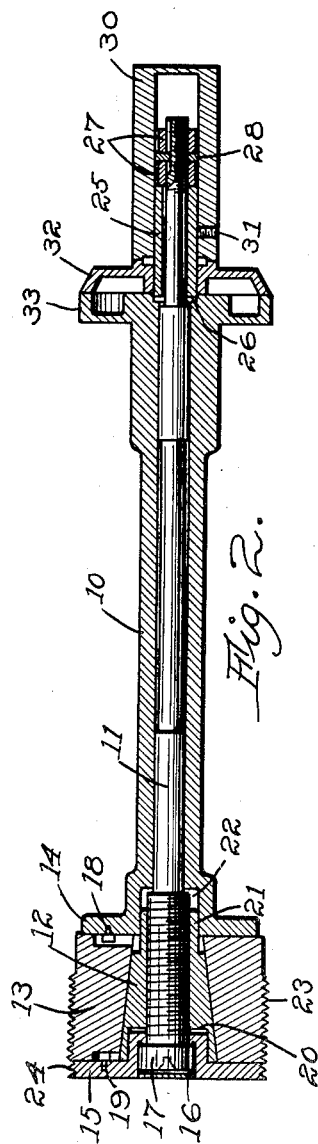
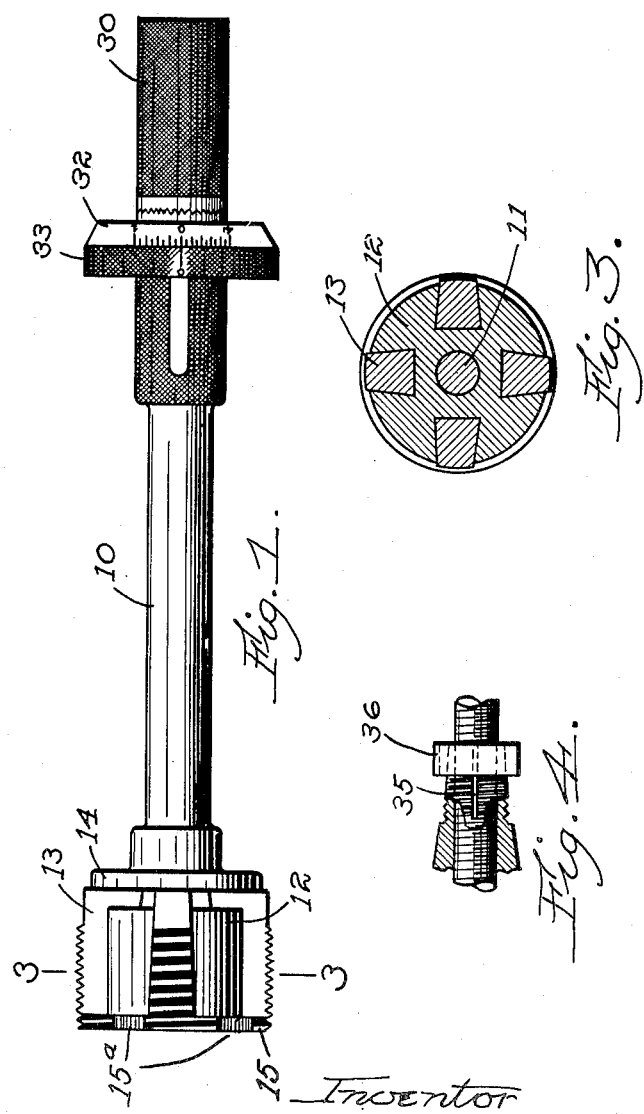
Inventor
John Bath
By Attorneys
Southgate & Southgate Patented Sept. 23, 1924.

1,509,578

UNITED STATES PATENT OFFICE.

JOHN BATH, OF WORCESTER, MASSACHUSETTS.

ADJUSTABLE INTERNAL GAUGE.

Application filed October 18, 1922. Serial No. 595,428.

*To all whom it may concern:*

Be it known that I, JOHN BATH, a citizen of the United States, residing at Worcester, in the county of Worcester and State of Massachusetts, have invented a new and useful Adjustable Internal Gauge, of which the following is a specification.

This invention relates to an adjustable gauge designed for accurate measurement of internal diameters.

In the particular embodiment illustrated in the drawings, the gauge is arranged for the measurement of internal screw threads but certain features thereof are not limited to such use.

One object of my invention is to provide a construction in which more convenient and accessible provision is made for longitudinal adjustment to prevent lost motion between the parts.

A second object is to provide an improved device for taking up lost motion or back lash between the operating shaft and the threaded member on which the gauge bars are supported and by which they are radially adjusted.

Another feature of my invention relates to the provision of a threaded pilot for an internal gauge, by means of which the device when used as a thread gauge, may be more quickly and easily entered in the work.

My invention further relates to arrangements and combinations of parts which will be hereinafter described and more particularly pointed out in the appended claims.

A preferred form of my invention is shown in the drawings, in which

Fig. 1 is a plan view of my improved gauge;

Fig. 2 is a longitudinal sectional elevation thereof;

Fig. 3 is a transverse sectional elevation taken along the line 3—3 in Fig. 1, and Fig. 4 is a detail longitudinal section of a slight modification.

Referring to the drawings, I have shown an adjustable internal gauge comprising a body 10 in which a shaft 11 is rotatably mounted. A member 12 is threaded on the shaft 11 and forms a support for a plurality of gauge bars 13. These bars 13 are preferably of dove-tailed section, as shown in Fig. 3, and their inner bearing faces are also slightly inclined relatively to the axis of the gauge. The bars are a close sliding fit in the member 12 and are adjusted radially by movement of the member 12 axially.

The bars 13 are held from longitudinal movement by engagement at one end with a flange 14 on the end of the body 10 and at the other end with a disc or plate 15 mounted on the end of the shaft 11. The disc 15 is preferably provided with an inwardly extending hub or boss 16 to receive the head 17 of the shaft 11. Keys 18 and 19 are fixed on the flange 14 and the plate 15 and are disposed in radial slots in one of the gauge bars 13, thus preventing angular movement of the bars 13 or plate 15 relative to the body 10.

The member 12 has a recess 20 in which the hub 16 of the plate 15 is relatively slidable and also has a projection 21 slidable in a recess 22 in the end of the body 10. All portions of the screw thread on the shaft 11 are thus fully protected from dirt and injury in all positions of the member 12.

When the device is used as a thread gauge, the outer faces of the bars 13 are provided with screw threads 23 and the edge of the plate 15 is also threaded as indicated at 24, the threads being of very slightly smaller dimensions than the thread to be measured. The plate 15 thus acts as a threaded pilot by which the gauge may be quickly and easily entered in the work.

I have found it desirable to provide recesses or grooves 15ª in the threaded periphery of the plate 15 so that any chips or dirt in the thread to be measured may accumulate in these recesses instead of being crowded into the screw threads.

At its opposite end, the shaft 11 is provided with a sleeve 25 keyed and slidable thereon and engaging a steel washer or other bearing surface 26 at the end of the body 10. Lock nuts 27 on the end of the shaft 11 provide for accurate adjustment of the sleeve 25 on the shaft. These nuts are preferably separated by a washer 28 having a lug or projection extending into a key-way on the shaft and thus preventing relative angular movement of the washer. The nuts 27 may be provided with slots so that they may be conveniently adjusted by a spanner wrench.

A tubular casing or cap 30 is slidable on the sleeve 25 and may be secured in position by a set screw 31. This casing encloses and protects the adjusting nuts 27 but may be axially removed when a new adjustment is desired.

The casing 30 is also provided with teeth or serrations at its inner end engaging similar teeth on a graduated disc or collar 32 which is loose on the sleeve 25 and which cooperates with an index flange 33 on the body 10 to give accurate indications of the diameter of the gauge. By loosening the set screw 31 and slightly withdrawing the casing 30, the graduated disc 32 may be set in any desired relative angular position, which relative position will be effectively maintained by restoring the casing 30 to engagement therewith.

In Fig. 4 I have shown convenient means for taking up back lash between the threaded member 12 and the shaft 11. For this purpose the part 35 corresponding to the extension 21 previously described is provided with a slightly tapered screw thread upon which is fitted an adjusting nut 36. By slightly tightening this nut any wear between the member 12 and the shaft 11 may be easily taken up.

Certain general features of my invention are not claimed herein, as they form the subject matter of a co-pending application, Serial No. 300,053, filed May 27, 1919.

Having thus described my invention and the advantages thereof, I do not wish to be limited to the details herein disclosed, otherwise than as set forth in the claims but what I claim is:—

1. An adjustable internal gauge having, in combination, a support having an elongated axis a plurality of gauge bars movable radially in said support and having inner bearing surfaces inclined relatively to the axis of the gauge, means engaging said inclined bearing surfaces and effective to move said bars simultaneously radially, said gauge bars having screw threads thereon, and a threaded pilot mounted adjacent the outer ends of said gauge bars and held from angular movement relative thereto.

2. An adjustable internal gauge having, in combination, a support having an elongated axis a plurality of gauge bars movable radially in said support and having inner bearing surfaces inclined relatively to the axis of the gauge, means engaging said inclined bearing surfaces and effective to move said bars simultaneously radially, said gauge bars having screw threads thereon, and a plate mounted adjacent the outer ends of said bars and having a pilot thread formed on its edge with approximately the dimensions of the thread to be measured.

3. An adjustable internal gauge having, in combination, a support having an elongated axis a plurality of gauge bars movable radially in said support and having inner bearing surfaces inclined relatively to the axis of the gauge, means engaging said inclined bearing surfaces and effective to move said bars simultaneously radially, said gauge bars having screw threads thereon, a plate forming the end of the gauge and holding said bars from longitudinal displacement, and means to prevent relative angular movement between said plate and bars, said plate having a thread formed thereon and forming a pilot by which said gauge bars may be entered in the work.

4. An adjustable internal gauge having, in combination, a support having an elongated axis a plurality of gauge bars movable radially in said support and having inner bearing surfaces inclined relatively to the axis of the gauge, means engaging said inclined bearing surfaces and effective to move said bars simultaneously radially, said means including a threaded member in which said bars are relatively slidable, a threaded shaft on which said member is threaded, said member having a tapered threaded extension, and a nut fitting said tapered extension and by which said member may be closely adjusted to fit said threaded shaft.

5. An adjustable internal gauge having, in combination, a body having an elongated axis, a plurality of gauge bars movable radially and having inner bearing surfaces inclined relatively to the axis of the gauge, means to move said bars simultaneously radially, said means including a threaded member in which said bars are relatively slidable, a threaded shaft rotatable in said body and on which said member is threaded, and means to prevent relative longitudinal movement of said shaft, gauge bars and body, said means comprising a sleeve keyed to said shaft and slidable to engage a shoulder fixed relatively to said body and devices on the shaft to adjust said sleeve axially.

6. An adjustable internal gauge having, in combination, a body having an elongated axis, a plurality of gauge bars movable radially and having inner bearing surfaces inclined relatively to the axis of the gauge, means to move said bars simultaneously radially, said means including a threaded member in which said bars are relatively slidable, a threaded shaft rotatable in said body and on which said member is threaded, and means to prevent relative longitudinal movement of said shaft, gauge bars and body, said means comprising a sleeve keyed to said shaft and slidable to engage a shoulder fixed relatively to said body, devices on the shaft to adjust said sleeve axially, and a removable casing for said shaft, covering and protecting said adjusting devices.

7. An adjustable internal gauge having, in combination, a body having an elongated axis, a plurality of gauge bars movable radially and having inner bearing surfaces inclined relatively to the axis of the gauge, means to move said bars simultaneously radially, said means including a threaded member in which said bars are relatively slidable, a threaded shaft rotatable in said body and on which said member is threaded, means to prevent relative longitudinal movement of said shaft, gauge bars and body, a graduated disc, adjusting devices therefor, and a casing effective to engage and lock said disc, said casing enclosing said adjusting devices and being removable to afford access thereto.

8. In an adjustable internal gauge, a body, an actuating shaft therein, a sleeve keyed to said shaft, lock nuts on the end of said shaft to hold said sleeve in fixed axial relation with said body, an index member on said body, a cooperating index collar loosely mounted on said sleeve, and a tubular locking member mounted on said sleeve and having a toothed end portion cooperating with a similar portion of said collar to hold said collar in adjusted angular position, said tubular member also enclosing said lock nuts and being removable to afford access thereto.

In testimony whereof I have hereunto affixed my signature.

JOHN BATH.